(12) United States Patent
Choi et al.

(10) Patent No.: US 6,730,135 B2
(45) Date of Patent: May 4, 2004

(54) ACTIVE NEGATIVE MATERIAL FOR LITHIUM SECONDARY BATTERY, METHOD OF PREPARING THE SAME AND LITHIUM SECONDARY BATTERY USING THE SAME

(75) Inventors: Wan-uk Choi, Suwon-si (KR); Kyou-yoon Sheem, Chonan-si (KR); Sang-young Yoon, Seoul (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 0 days.

(21) Appl. No.: 09/265,601

(22) Filed: Mar. 10, 1999

(65) Prior Publication Data

US 2002/0039685 A1 Apr. 4, 2002

(30) Foreign Application Priority Data

Mar. 10, 1998 (KR) .............................................. 98-7854

(51) Int. Cl.[7] .............................. H01M 4/60; H01M 4/04
(52) U.S. Cl. .................................... 29/623.1; 429/231.8
(58) Field of Search ....................... 429/231.8; 29/623.1

(56) References Cited

U.S. PATENT DOCUMENTS

| 4,978,600 | A | * | 12/1990 | Suzuki et al. | ............ | 429/231.8 |
|---|---|---|---|---|---|---|
| 5,688,483 | A | * | 11/1997 | Zhang et al. | ............ | 423/445 R |
| 5,721,071 | A | * | 2/1998 | Sonobe et al. | ........... | 429/231.8 |
| 5,906,900 | A | * | 5/1999 | Hayashi et al. | .......... | 429/231.8 |
| 5,932,373 | A | * | 8/1999 | Nagamine et al. | ....... | 429/218.1 |
| 6,139,990 | A | * | 10/2000 | Kubota et al. | ........... | 429/231.8 |
| 6,245,460 | B1 | * | 6/2001 | Choi et al. | ............... | 429/231.4 |

OTHER PUBLICATIONS

B.D. Culity, Elements of X–ray Diffraction, 2nd ed. 1978 (no month). p. 401.*

* cited by examiner

*Primary Examiner*—Patrick Ryan
*Assistant Examiner*—Tracy Dove
(74) *Attorney, Agent, or Firm*—Blakely, Sokoloff, Taylor & Zafman

(57) ABSTRACT

A negative active material for a lithium secondary battery includes a graphite-like carbon material having an intensity ratio $I(110)/I(002)$ of an X-ray diffraction peak intensity $I(002)$ at a (002) plane to an X-ray diffraction peak intensity $I(110)$ at a (110) plane of less than 0.2. The negative active material prepared by dissolving a coar tar pitch or a petroleum pitch in an organic solvent to remove insoluble components therefrom, heat-treating the pitch at a temperature in the range of 400 to 450° C. for 4 hours or more under an inert atmosphere to thereby produce at least 50 weight percent of mesophase particles based on the pitch, coking the pitch including mesophase particles, carbonizing the coked pitch, pulverizing the carbonized pitch; and graphitizing the pulverized pitch.

4 Claims, 2 Drawing Sheets

US 6,730,135 B2

ACTIVE NEGATIVE MATERIAL FOR LITHIUM SECONDARY BATTERY, METHOD OF PREPARING THE SAME AND LITHIUM SECONDARY BATTERY USING THE SAME

CROSS-REFERENCES TO RELATED APPLICATIONS

This application is based on application No. 98-7854 filed in the Korean Industrial Property Office on Mar. 10, 1998, the content of which is incorporated hereinto by reference.

BACKGROUND OF THE INVENTION (a) Field of the Invention

The present invention relates to and an active negative material for lithium secondary battery, a method of preparing the same and a lithium secondary battery using the same, and more particularly, to an active negative material useful for fabricating a lithium secondary battery having a high capacity.

(b) Description of the Related Art

In recent years, the development of miniaturized portable electronics provokes needs for a secondary battery having a high capacity as well as a light weight. From the viewpoint of the capacity improvement per unit weight, the lithium secondary battery is preferably adopted because lithium has a high standard potential as well as a low electrochemical equivalent weight.

FIG. 1 is a schematic cross sectional view showing the general structure of the coin-typed lithium secondary battery. As shown in FIG. 1, the lithium secondary battery includes a positive electrode plate 40 having a collector 1 made of nickel and an active material layer 10 coated on the collector 1, a negative electrode plate 45 having a collector 1' made of copper and an active material layer 30 coated on the collector 1', and a separator 25 interposed between the positive and negative electrode plate 40 and 45. The positive and negative electrode plates 40 and 45 essentially form an electrode plate assembly together with the separator 25. The electrode plate assembly is inserted into an opening portion of a battery case 5 internally surrounded with a gasket 20 while receiving an electrolyte 15 therein. The opening portion of the battery case 5 is covered by a cap 35.

FIG. 2 is a schematic cross sectional view showing the general structure of the cylindrical-typed lithium secondary battery. As shown in FIG. 2, the lithium secondary battery includes positive electrodes 50, negative electrodes 55 stacked in order and separated by a separator 60. The layered structure is wound a number of times in a spiral form to obtain an electrode winding body. The electrode winding body is inserted into a battery can 90 including nickel plated steel insulating plates 80, 85 respectively inserted into the top and bottom of the battery can 90. For the purpose of collecting electricity of the negative electrode, one end of a nickel negative lead 75 is pressure-connected to the negative electrode, and the other end thereof is welded to the battery can 90. In addition, in order to collect electricity of the positive electrode, one end of an aluminum positive electrode lead 70 is attached to positive electrode 50, and the other end is welded to battery cover 100 having current interrupting mechanism 105.

Lithium-containing transitional metal oxide such as $LiCoO_2$, $LiNiO_2$, $LiMn_2O_4$ and $LiNi_xCo_{1-x}O_y$ are preferably selected for the positive electrode active materials in conjuction with a polyethylene-based porous film for the separator.

As for the negative electrode active materials, lithium metal is attractive because it has a light weight and high capacity per unit weight to thereby output high voltage in the battery use. However, the use of lithium metal for the negative electrode material reveals serious defects in a cycle life and stability of the battery because the lithium metal is highly reactive with the electrolytic solvent and easily forms needle dendrites during cyciling, casusing destruction of the separator and a short circuit. In order to avoid the defects, lithium alloys are employed as the negative electrode active material instead of the lithium metal but yet reveals similar problems.

Alternatively, carbon materials, which can reversibly accept and donate significant amounts of lithium without affecting their mechanical and electrical properties, are proposed for the negative electrode active material.

The carbon materials adapted for use in a battery are generally spherical type carbon materials and fiber type carbon materials. A method for preparing the spherical type carbon material is disclosed in Japanese Patent No. Hei 1-27968. In the method, a coal tar pitch is heat-treated and centrifuged to thereby produce small spherical particles having an optical anisotropy (referred to hereinafter more simply as mesophase particles). Alternatively, a coar tar pitch is centrifuged to obtain supernatant and the supernatant is heat-treated, obtaining mesocarbon microbeads.

However, the aforementioned techniques are not economical and the manufacturing process is complicate because the centrifugation step should performed for obtaining mesophase particles. Furthermore, mesophase particles is only used for preparing spherical carbon materials, the total yield is low.

SUMMARY OF THE INVENTION

It is an object of the present invention to provide a negative active material useful for fabricating a lithium secondary battery having a high capacity.

It is another object of the present invention to provide a method of preparing the negative active material with simple manufacturing process and high yield.

It is another object of the present invention to provide a lithium secondary battery using the negative active material.

In order to achieve this object and others, the present invention provides a negative active material including a graphite-like carbon material having an intensity ratio $I(110)/I(002)$ of an X-ray diffraction peak intensity $I(002)$ at a (002) plane to an X-ray diffraction peak intensity $I(110)$ at a (110) plane of less than 0.2. The negative active material is prepared by dissolving a coal tar pitch or a petroleum pitch in an organic solvent to remove insoluble components therefrom, heat-treating the pitch at a temperature in the range of 400 to 450° C. for four hours or more to thereby produce at least 50 weight percent of mesophase particles based on the pitch, coking the pitch including the mesophase particles, carbonizing the coked pitch, pulverizing the carbonized pitch and graphitizing the pulverized pitch.

The lithium secondary battery includes a negative electrode having the negative active material, a positive electrode having a lithium containing material that can reversibly intercalate and de-intercalate lithium ion and a non-aqueous electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings.

DETAILED DESCRIPTION OF THE INVENTION

Figure 1:
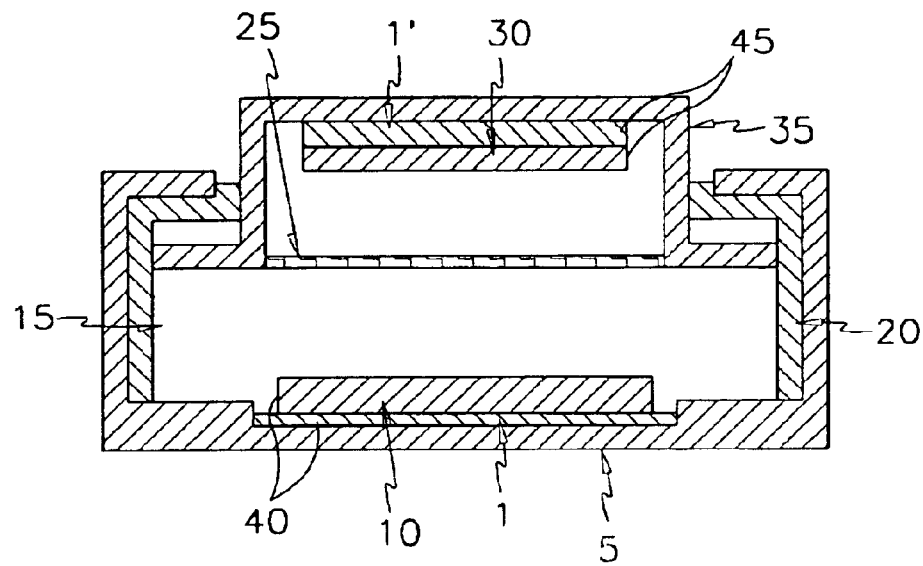
FIG. 1 is a schematic diagram of a 2016 typed coin cell.

The negative active material for the lithium secondary battery according to the present invention includes a graphite-like carbon material which has an intensity ratio I(110)/I(002) of an X-ray diffraction peak intensity I(002) at a (002) plane to an X-ray diffraction peak intensity I(110) at a (110) plane of less than 0.2.

The graphite-like carbon material more preferably has an intensity ratio I(110)/I(002) of less than 0.04. That is, the lower the intensity ratio of the intensity at the (110) plane which reveal crystallinity during X-ray diffraction analysis, the higher the capacity of the graphite-like carbon material.

The negative active material is prepared by the following method. A coar tar pitch or a petroleum pitch is dissolved in an organic solvent to remove insoluble components therefrom. The organic solvent may be tetrahydrofuran, quinoline, benzene or toluene. The pitch is heat-treated at a temperature in the range of 400 to 450° C. for 4 hours or more under an inert atmosphere such nitrogen or argon to thereby produce at least 50 weight percent of mesophase particles based on the pitch. The mesophase particles contained in the pitch may present in the amount of 50 to 98 weight percent. The pitch including the 50 to 98 weight percent of mesophase particles is used for preparing negative active material, a battery having a high capacity can be produced.

The pitch including the mesophase partcles is coked. The coking step is preferably performed at a rising temperature up to 600° C. under an inert atmosphere. Thereafter, the coked pitch is carbonized at a temperature in the range of 1,000 to 1,300° C. The carbonizing step is to remove components such as H, N and O from the coked material. The components are not well removed at temperatures lower than 1,000° C. On the other hand, when the carbonizing step is performed at temperature exceeding 1,300° C., a fine structure is significantly developed, causing reduction in the charge and discharge capacity.

The carbonized pitch is pulverized to thereby produce no particular shape particles. The amorphous particles are graphitized at a temperature in the range of 2,500 to 3,000° C. The graphitizing step is to arrange the fine structure of the carbonized material. When the graphitizing step is performed at temperatures below 2,500° C., the crystalline structure is not well developed and amorphous portions may be present. On the other hand, when the graphitizing step is performed at temperatures exceeding 3,000° C., the value of I(110)/I(002) greatly increases and the charge and discharge efficiency is undesirably low. If the value of I(110)/I(002) exceeds 0.2, is more than, charge and discharge capacity decrease.

The present carbon material for use in the lithium secondary battery includes the mesophase particles in the optimum content. In the present invention, the optimum content is controlled by determining the electrochemical characteristics of the carbon material, while the mesophase particles content is changed.

Conventionally, as the mesophase particles, spherical or fibrous mesophase particles are only used for preparing a negative active material. Due to this, the separation of spherical or fibrous mesophase particles should be performed, causing the complication of negative active material manufacturing process. Furthermore, as the no spherical or no fibrous mesophase particles wastes, the total yield is low. On the hand, in the present invention, the mesophase particles having no particular shape is used in the present invention without separating spherical mesophase particles or fibrous mesophase particles. Therefore, a negative active material having a high capacity can be produced with a high yield.

In the present invention, the graphite-like carbon material having a high capacity is prepared by comparing an integral intensity I(002) of the X-ray diffraction peak at the (002) plane with an integral intensity I(110) of the X-ray diffraction peak at the prismatic plane (110). That is, main point of the present invention is posed on the twist of carbon atoms in an unit lattice of the crystalline structure, rather than on the contributing effect to the electric capacity by separating the crystalline portion and the amorphous portion. Furthermore, when the value of I(110)/I(002) is low, the identical effect can be obtained irrespective of crystallinity. The graphite-like carbon material for use in the present invention has a crystal size in the direction of the c axis (Lc) of 10–100 nm and in the direction of the a axis (La) of 20–200 nm, the intensity ratio I(110)/I(002) of an X-ray diffraction peak intensity I(002) at a (002) plane to an X-ray diffraction peak intensity I(110) at a (110) plane of 0.012 to 0.20, and a specific surface of 3–20 m$^2$/g.

The fine structure of the synthesized carbon material is changed in accordance with the preparing conditions and reveals difference to a natural graphite. The experimental tests exhibited that the lower the intensity ratio of the (002) plane to the (110) plane which reveal a crystallinity during X-ray diffraction anaylsis, the higher the capacity of the graphite-like carbon material. Therefore, a lithium secondary battery having a high capacity can be fabricated with a graphitic-like carbon material having a low intensity ratio of the (002) plane to the (110) plane for the negative electrode active material.

The present invention will be now described with reference to Examples and drawings.

EXAMPLE 1

A coar tar pitch was dissolved in tetrahydrofuran and insoluble components were removed therefrom. The residual components were heat-treated at 430° C. for four hours under a gaseous nitrogen atmosphere to thereby produce 50 weight percent of mesophase particles based on the pitch. Thereafter, the resulting pitch including mesophase particles were heated at a rising temperature up to 600° C. under a gaseous nitrogen atmosphere to thereby coke them. The coked pitch was then carbonized at 1000° C. Next, the carbonized pitch was pulverized to thereby obtain a pulverized pitch having no particular shape. The pluverized pitch having no particular shape was graphitized at 2800° C. for 30 minutes under an inert atmosphere of gaseous nitrogen/argon atmosphere. As a result, a carbon material having a graphite structure was prepared.

EXAMPLE 2

A carbon material was prepared by the same procedure in Example 1 except that the tetrahydrofuran-insoluble components removed pitch was heat-treated at 430° C. for 8 hours to thereby produce 70 weight percent of mesophase particles base on the pitch.

EXAMPLE 3

A carbon material was prepared by the same procedure in Example 1 except that the tetrahydrofuran-insoluble components removed pitch was heat-treated at 430° C. for 15 hours to thereby produce 98 weight percent of mesophase particles base on the pitch.

Each of the graphite-like carbon materials according to the Examples 1 to 3 of the present invention was mixed with a solution of polyvinylene fluoride in a N-methyl pyrrolidone solvent to be thereby made into a slurry. Then, the slurry was coated on a collector made of copper foil to thereby form a negative electrode plate. Next, a lithium secondary cell was as shown in FIG. 1 prepared using the negative electrode plate together with a current electrode made of lithium metal foil and an electrolyte of $LiPF_6$ in an organic solvent. The capacity and discharge efficiency (discharge capacity/charge capacity) of each cell were measured and the results are presented in Table 1.

For comparison, a lithium secondary cell was prepared by the above method with mesocarbon microbeads (Japan, Osaka Gas). The capacity and discharge efficiency of the compared cell was also measured and the results are presented in Table 1.

TABLE 1

|  | Capacity [mAh/g] | Efficiency | I(110)/I(002) |
|---|---|---|---|
| Example 1 | 290 | 88 | 0.016 |
| Example 2 | 300 | 83 | 0.012 |
| Example 3 | 314 | 92 | 0.015 |
| Compared cell | 280 | 85 | 0.20 |

Figure 2:
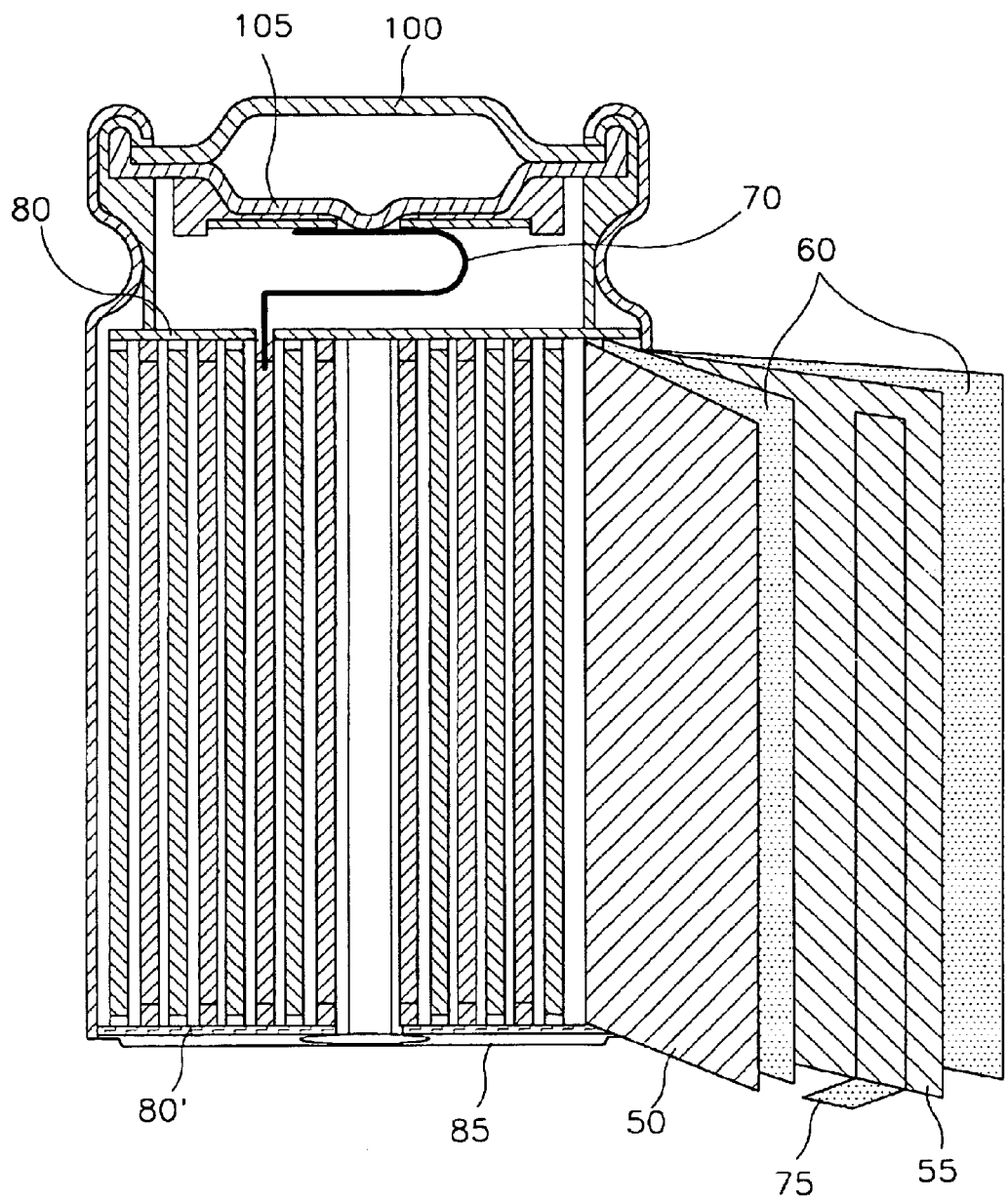
FIG. 2 is a schematic diagram of a 18650 typed cylindrical cell.

For reference, a cylindrical cell as shown in FIG. 2 was manufactured by using a negative electrode plate including the carbon material obtained by the Example 3 coated on a current collector made of copper foil and a positive electrode plate including $LiCoO_2$ coated on a collector made of the nickel foil. The capacity of the cylindrical cell was measured and the results are 1600 mAh.

As described above, in the present invention, the each of carbon materials having different mesophase particles content and is used for a lithium secondary battery, the lithium secondary battery having a high capacity can be prepared. Furthermore, the present invention can produce carbon material with a simple manufacturing process and a high yield.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a negative active material having no particular shape for a lithium secondary battery, comprising the steps of:

dissolving a coal tar pitch or a petroleum pitch in an organic solvent to remove all organic-insoluble components therefrom and to obtain organic-soluble components;

heat-treating the organic-soluble components at a temperature in the range of 400 to 450° C. for 4 hours or more under an inert atmosphere to thereby produce at least 50 weight percent of mesophase particles having no particular shape based on the pitch;

coking the pitch including mesophase particles;

carbonizing the coked pitch;

pulverizing the carbonized pitch; and graphitizing the pulverized pitch.

2. The method of claim 1 wherein the inert atmosphere is a gaseous nitrogen or argon atmosphere.

3. The method of claim 1 wherein the mesophase particles are produced by 50 to 98 weight percent based on the pitch.

4. The method of claim 1 wherein the coking step is performed at a rising temperature up to 600° C. under an inert atmosphere.

* * * * *